(12) United States Patent
Leisten

(10) Patent No.: US 9,856,775 B2
(45) Date of Patent: Jan. 2, 2018

(54) ASSEMBLY UNIT OF AN EXHAUST SYSTEM COMPOSED OF COMPONENTS MADE OF DIFFERENT MATERIALS WITH IMPROVED DURABILITY

(71) Applicant: Eberspächer Exhaust Technology GmbH & Co. KG, Neunkirchen (DE)

(72) Inventor: Philippe Leisten, Pliezhausen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 106 days.

(21) Appl. No.: 14/593,201

(22) Filed: Jan. 9, 2015

(65) Prior Publication Data

US 2015/0198077 A1    Jul. 16, 2015

(30) Foreign Application Priority Data

Jan. 16, 2014    (DE) .................. 10 2014 100 472

(51) Int. Cl.
*F01N 13/08*  (2010.01)
*F16L 13/02*  (2006.01)
*F16L 25/10*  (2006.01)
*F16L 25/14*  (2006.01)
*F01N 13/18*  (2010.01)

(52) U.S. Cl.
CPC ......... *F01N 13/08* (2013.01); *F01N 13/1805* (2013.01); *F01N 13/1838* (2013.01); *F01N 13/1861* (2013.01); *F16L 13/02* (2013.01); *F16L 25/10* (2013.01); *F16L 25/14* (2013.01); *F01N 2260/10* (2013.01); *F01N 2260/20* (2013.01); *F01N 2450/22* (2013.01); *F01N 2470/24* (2013.01); *F01N 2470/28* (2013.01)

(58) Field of Classification Search
CPC .. F01N 13/08; F01N 13/1805; F01N 13/1838; F01N 13/1861; F01N 2260/10; F01N 2260/20; F01N 2450/22; F01N 2470/24; F01N 2470/28; F16L 13/02; F16L 25/10; F16L 25/14
See application file for complete search history.

(56) References Cited

U.S. PATENT DOCUMENTS 7,241,426 B2 *  7/2007  Hardesty ............ B01D 53/9454
                                                         422/177
7,323,030 B2 *  1/2008  Andersen .............. F01N 3/0211
                                                         422/168

* cited by examiner

*Primary Examiner* — Brandon Lee
(74) *Attorney, Agent, or Firm* — McGlew and Tuttle, P.C.

(57) ABSTRACT

An assembly unit 1 of an exhaust system has at least one and particularly two connection funnels 2 made of cast material and a pipe 3. The at least one connection funnel 2 has a pipe socket 21 and at least one bracket 22. The bracket 22 is arranged outside of the pipe socket 21. A connection section 31 of the pipe 3 is fastened to the bracket 22 of the at least one connection funnel. The pipe socket 21 extends beyond the connection section 31 of the pipe 3 into the interior of the pipe 3 and is spaced apart from an inner wall of the pipe 3 by at least the simple wall thickness of the pipe 3.

13 Claims, 2 Drawing Sheets

ASSEMBLY UNIT OF AN EXHAUST SYSTEM COMPOSED OF COMPONENTS MADE OF DIFFERENT MATERIALS WITH IMPROVED DURABILITY

CROSS REFERENCE TO RELATED APPLICATIONS

This application claims the benefit of priority under 35 U.S.C. §119 of German Patent Application DE 10 2014 100 472.8 filed Jan. 16, 2014, the entire contents of which are incorporated herein by reference.

FIELD OF THE INVENTION

The present invention pertains to an assembly unit for an exhaust system composed of components made of different materials, which has an improved durability.

BACKGROUND OF THE INVENTION

Components made of cast material and particularly cast iron as well as sheet metal material are used in exhaust systems. Components made of cast material are particularly used when continuously variable transitions or complicated flow paths shall be formed, whereas components made of sheet metal material are used, when constant cross sections shall be maintained for a certain length. An example of a component made of a cast material is the exhaust elbow, an example of a component made of a sheet metal material is the exhaust pipe. The connection between a component made of a cast material and a component made of a sheet metal material is frequently established by means of soldering or welding. A component made of a cast material which is permanently connected with a component made of a sheet metal material is designated as assembly unit in the present document.

Because of the different thermal expansion properties of the materials made of cast material and of sheet metal material, which can also be attributed to different wall thicknesses, problems, which may lead to a leaking of the assembly unit overall, frequently arise in the connection area between components made of cast material and components made of sheet metal material.

SUMMARY OF THE INVENTION

On this basis, an object of the present invention is to provide an assembly unit of an exhaust system composed of components made of different materials, which has an improved durability.

Embodiments of an assembly unit of an exhaust system have at least one connection funnel made of cast material and at least one pipe, whereby both the at least one connection funnel and the at least one pipe are designed for hot exhaust gas to flow through them. The at least one connection funnel has a pipe socket and at least one bracket. The bracket is arranged outside of the pipe socket. A connection section of the pipe is fastened to the bracket of the at least one connection funnel. The pipe socket in this case extends beyond the connection section of the pipe into the interior of the pipe and is also spaced apart from an inner wall of the pipe by at least the simple wall thickness of the pipe.

By the pipe socket extending beyond the connection section into the interior of the pipe and being spaced apart from an inner wall of the pipe, the pipe socket acts as a thermal insulation with regard to the connection section, since hot exhaust gas guided in the pipe is guided through the pipe socket at a distance from the connection section. In tests, the temperature of the connection section could thus be lowered by absolute 100° C. or relatively 13%.

In this document, the connection section of the pipe is defined as that pipe section, which lies flatly against (the surface of the section lies along or extends along) the bracket of the connection funnel or runs parallel to this bracket. Further, the connection section comprises that section of the pipe, in which an auxiliary agent such as solder or a weld seam is located, which fastens the pipe to the bracket of the connection funnel.

According to one embodiment, a correspondingly designed connection funnel is fastened at each of the two ends of the pipe, such that the assembly unit has two connection funnels overall.

According to one embodiment, the at least one connection funnel has three or more brackets, which are arranged uniformly distributed about the pipe. If a plurality of brackets are used, a gas-tightness of the connection between the connection funnel and the pipe can be guaranteed via a main body of the connection funnel.

According to one embodiment, the at least one connection funnel has exactly one bracket which has a ring-shaped or oval cross section. Such brackets are well suited to hold pipes with round or oval cross section.

According to one embodiment, the pipe socket has a ring-shaped or oval cross section and is thus well suited to be arranged in a pipe with round or oval cross section.

According to one embodiment, the pipe socket of the at least one connection funnel extends beyond the connection section of the pipe into the interior of the pipe by at least 0.8 cm and particularly by at least 1 cm and particularly by at least 1.5 cm and particularly by at least 2 cm and more particularly by at least 3 cm. According to one embodiment, the length of the connection funnel and of the connection section is measured along a straight line that runs parallel to an axial direction of the pipe or axis of symmetry of the pipe in the area of the connection funnel. It was discovered that such dimensioned connection funnels are particularly well suited to be used as thermal insulation for connections between pipes and connection funnels made of cast material.

According to one embodiment, the pipe socket of the at least one connection funnel extends beyond the connection section of the pipe into the interior of the pipe by less than 10 cm and particularly by not more than 3 cm. It was discovered that no further essential improvement in the thermal insulation of the connection between the pipe and the connection funnel is achieved with greater lengths of the pipe socket. According to one embodiment, the pipe socket of the at least one connection funnel extends beyond the connection section of the pipe into the interior of the pipe by at least 1 cm and not more than 2 cm.

According to one embodiment, the pipe socket of the at least one connection funnel is spaced apart from the inner wall of the pipe by at least 0.8 mm and particularly by at least 1 mm and particularly by at least 1.5 mm and particularly by at least 3 mm and particularly by at least 5 mm and more particularly by at least 7 mm. At these distances, the radiant heat transmitted by the pipe socket to the connection section can be prevented from becoming too great.

According to one embodiment, the pipe socket of the at least one connection funnel is spaced apart from the inner wall of the pipe by less than 3 cm and particularly by not more than 7 mm. It was discovered that the thermal insulation is not further essentially improved with greater distances. Further, with still greater distances between the pipe socket and the inner wall of the pipe, stronger swirlings of the exhaust gas entering there and thus an increased heat conduction to the connection section may occur. According to one embodiment, the pipe socket of the at least one connection funnel is spaced apart from the inner wall of the pipe by at least 1 mm and not more than 5 mm.

According to one embodiment, the pipe socket of the at least one connection funnel has a first section, at which the pipe socket has a constant distance from the inner wall of the pipe. Further, the pipe socket of the at least one connection funnel has a second section, in which the pipe socket has a distance from the inner wall of the pipe that is constantly increasing in relation to the distance in the first section. Here, the second section is adjacent to the first section and the second section is arranged between the first section and a main body of the connection funnel, via which main body the pipe socket is connected with the bracket. This leads to the distance between the pipe socket and bracket increasing towards the end of the pipe and being maximum at the end of the pipe. Thus, it can be guaranteed that the thermal output between the pipe socket and the bracket is low.

According to one embodiment, the pipe socket of the at least one connection funnel has a wall thickness, which corresponds at least to two times and particularly at least to five times and more particularly at least to 10 times the wall thickness of the pipe. Consequently, the wall thicknesses of the pipe and of the pipe socket differ from one another greatly.

According to one embodiment, the pipe socket and the at least one bracket of the at least one connection funnel together have a U-shaped cross section, whereby the "U" has a short leg and a long leg. The short leg of the "U" forms the bracket and the long leg of the "U" forms the pipe socket. Both legs are directed towards the pipe and the bottom of the U shape is in fluid connection with the interior of the pipe.

According to one embodiment, the connection between the connection section of the pipe and the bracket of the connection funnel is established via a weld seam or soldered seam. Such connections can be established in a cost-effective and gas-tight manner.

According to one embodiment, the at least one bracket of the at least one connection funnel is arranged inside or outside of the pipe and overlaps the pipe by at least 1 mm and particularly by at least 2 mm and more particularly by at least 3 mm in the longitudinal direction of the pipe. This overlap facilitates the arrangement of the bracket at the pipe and the providing of a gas-tight connection between the connection funnel and the pipe.

According to one embodiment, the pipe is spaced apart from the at least one bracket of the at least one connection funnel by less than 1.5 mm and particularly by less than 1.0 mm and more particularly by less than 0.5 mm. Thus, between the pipe and the bracket, there is only a slight clearance, which facilitates the insertion of the pipe at the bracket. If this clearance is too large, it will be difficult to fasten the pipe gas-tightly to the bracket. In addition, a good fitting of the pipe at the bracket reduces a load of a weld seam or soldered seam.

According to one embodiment, the pipe socket and the bracket of the at least one connection funnel are connected with one another over their entire circumference and particularly in a gas-tight manner.

According to one embodiment, the pipe is composed of a sheet metal material and particularly of a steel plate and more particularly of a low-alloy steel plate. Such pipes have a low weight, can be manufactured in a cost-effective manner and therefore are widely used in exhaust systems.

According to one embodiment, the pipe socket of the at least one connection funnel has a length, which corresponds at least to 1.25 times and particularly at least to 1.5 times and particularly at least two times and more particularly at least three times the length of the at least one bracket. Here, this length is measured parallel to an axial direction of the pipe or axis of symmetry of the pipe in the area of the connection funnel.

Embodiments of an exhaust system for a vehicle operated by an internal combustion engine have an exhaust elbow, a tail pipe and an assembly unit as described above. The exhaust elbow in this case is designed for connection to an internal combustion engine and the tail pipe is in fluid connection with the exhaust elbow via an exhaust pipe. Further, the at least one connection funnel and the pipe of the assembly unit are arranged along the exhaust line between the exhaust elbow and the tail pipe and are thus in fluid connection both with the exhaust elbow and the tail pipe.

Although the above described assembly unit of an exhaust system is particularly well suited for being used in a passenger car, the present invention is not restricted to usage of the assembly unit in passenger cars. For instance, the assembly unit of an exhaust system may alternatively be used for a motor truck. If used in a motor truck, the diameters defined above may be increased by the 2.5-fold to 3-fold.

In this connection, it should be pointed out that the terms "comprise," "have," "include," "contain" and "with," as well as their grammatical variations, used for listing features in this specification and the claims can generally be regarded as nonexclusive listing of features, such as, e.g., process steps, means, areas, sizes and the like, and in no way rule out the presence of other or additional features or groups of other or additional features.

Further features of the present invention arise from the following description of exemplary embodiments in conjunction with the claims as well as the figures. Identical or similar components are designated with identical or similar reference numbers in the figures. It should be pointed out that the present invention is not limited to the embodiments of the exemplary embodiments described, but is determined by the scope of the attached patent claims. In particular, the individual features in embodiments according to the present invention may be embodied in different number and combination than in the examples given below. Furthermore, it should be pointed out that the drawings are not true to scale. In the following explanation of an exemplary embodiment of the present invention, reference is made to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
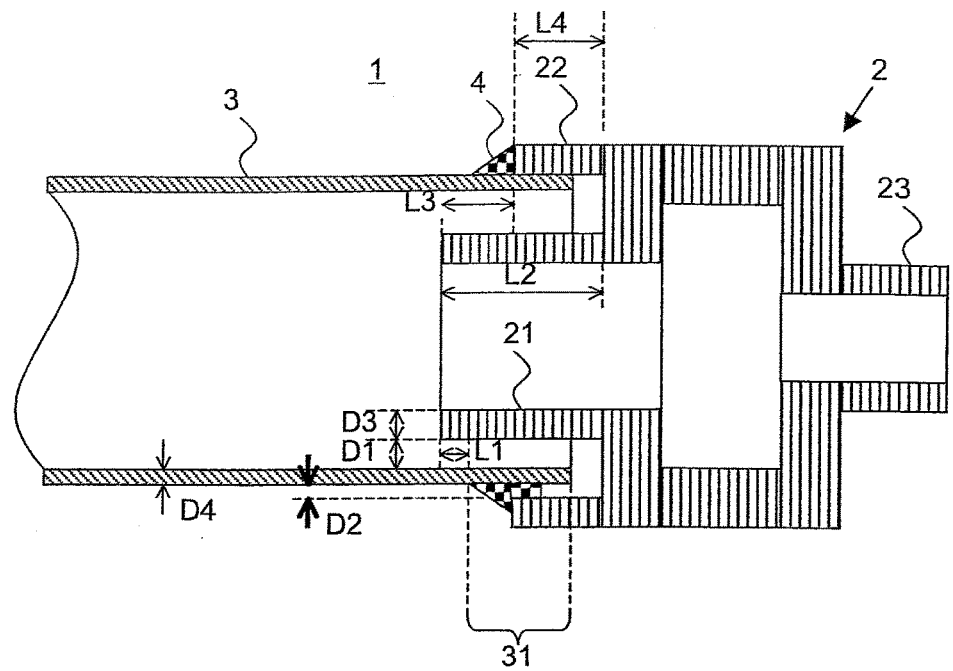
FIG. 1 is a schematic view showing a longitudinal section through an assembly unit composed of at least one connection funnel and a pipe according to a first embodiment.

Referring to the drawings, in the first embodiment schematically shown in longitudinal section in FIG. 1, the assembly unit 1 is composed of a not completely shown pipe 3 made of a low-alloy steel and at least one connection funnel 2 made of cast iron fastened to it. An identical or variant connection funnel may be provided at the, not shown, end of the pipe 3.

In the embodiment shown, the pipe 3 has a round cross section with an internal diameter of 58 mm and an external diameter of 60 mm. Thus, a wall thickness D4 of the pipe is exactly 1 mm. The pipe 3 is cut off vertically to its direction of extension at its end facing towards the connection funnel 2. It is emphasized that the present invention is not restricted to a pipe as described above. For example, a pipe having an external diameter of 110 mm and a wall thickness of between 0.8 mm and 1.5 mm may be used instead. The dimensions of the connection funnel would have to be adapted accordingly.

The connection funnel 2 has a pipe socket 21 having a ring-shaped cross section, which is arranged concentrically inside of a bracket 22, likewise having a ring-shaped cross section. Thus, the bracket 22 is arranged radially outside of the pipe socket 21 and is spaced apart from the pipe socket 21. In the embodiment shown, a distance between an inner wall of the bracket 22 and an outer wall of the pipe socket 21 is exactly 20 mm. It is emphasized that the present invention is not restricted to the distances described above. For example, the distance between the inner wall of the bracket and the outer wall of the pipe socket may alternatively be selected between 1.8 mm and 6.5 mm.

Further, the pipe socket 21 has a length L2 of 40 mm, which corresponds to twice a length L4 of the bracket 22 of 20 mm. Consequently, the pipe socket 21 extends beyond the bracket 22 into the interior of the pipe 3 by a length L3 of 20 mm. It is emphasized that the present invention is not restricted to the dimensions described above. For example, the length L2 of the pipe socket may be between 25 mm and 40 mm. Furthermore, the pipe socket may alternatively extend beyond the bracket into the interior of the pipe by a length L3 of between 10 mm and 20 mm, for example.

The pipe socket 21 has a wall thickness D3 of 10 mm and thus 10 times the wall thickness D4 of the pipe 3. It is emphasized that the present invention is not restricted to the wall thickness described above. For example, the wall thickness D4 of the pipe may be between 1.5 mm and 2.5 mm and in particular 2 mm.

The pipe 3 overlaps the bracket 22, which encloses an outer wall of the pipe 3, by 15 mm. The pipe 3 includes a connection section end surface 26. There is a clearance D2 of 1 mm here between an outer wall of the pipe 3 and an inner wall of the bracket 22. In the area of the overlap, the pipe 3 is fastened in a gas-tight manner over its entire circumference to the bracket 22 of the connection funnel 2 by means of a weld seam 4.

The weld seam 4 and the overlap of the pipe 3 with the bracket 22 together establish a connection section 31. Obviously, the pipe socket 21 has a length L2, which extends beyond the connection section 31 of the pipe 3 into the interior of the pipe 3 by a length L1 of 10 mm. Here, an outer side of the pipe socket 21 has a minimal distance D1 of 18 mm from an inner wall of the pipe 3, when the maximum clearance D2 between the outer wall of the pipe 3 and the inner wall of the bracket 22 is arranged on one side. It is emphasized that the present invention is not restricted to the minimal distance of the outer side of pipe socket from the inner wall of the pipe as described above. For example, the distance D1 of the outer side of pipe socket from the inner wall of the pipe may alternatively be selected between 1 mm and 5 mm.

Together the pipe socket 21 and the bracket 22 of the connection funnel 2 have a U-shaped cross section, whereby the pipe socket 21 forms a long leg of the "U" arranged in the interior of the pipe 3 and the bracket 22 forms a short leg of the "U" arranged outside of the pipe 3, and the bottom of the U shape is in fluid connection with an interior of the pipe 3.

Because of the circumferential gas-tight connection formed by the weld seam 4 between the outer wall of the pipe 3 and the bracket 22, exhaust gas, which is guided in the pipe 3, can penetrate the space formed between the outer side of the pipe socket 21 and the inner side of the bracket 22 and between the outer side of the pipe socket 21 and the inner wall of the pipe 3, but cannot continue to flow there, such that a relatively static exhaust gas blanket is formed. This exhaust gas blanket contributes to the insulation of the pipe socket 21 against the pipe 3 in the connection section 31 and thus helps to reduce a thermal load of the weld seam 4.

At its end opposite the pipe socket 21, the connection funnel 2 has a connection fitting 23 with a reduced internal diameter compared with the pipe socket 21.

A second embodiment of an assembly unit 1' is described below with reference to FIG. 2. Since this second embodiment is very similar to the first embodiment described above, only differences will be dealt with below and otherwise reference is made to the first embodiment.

Figure 2:
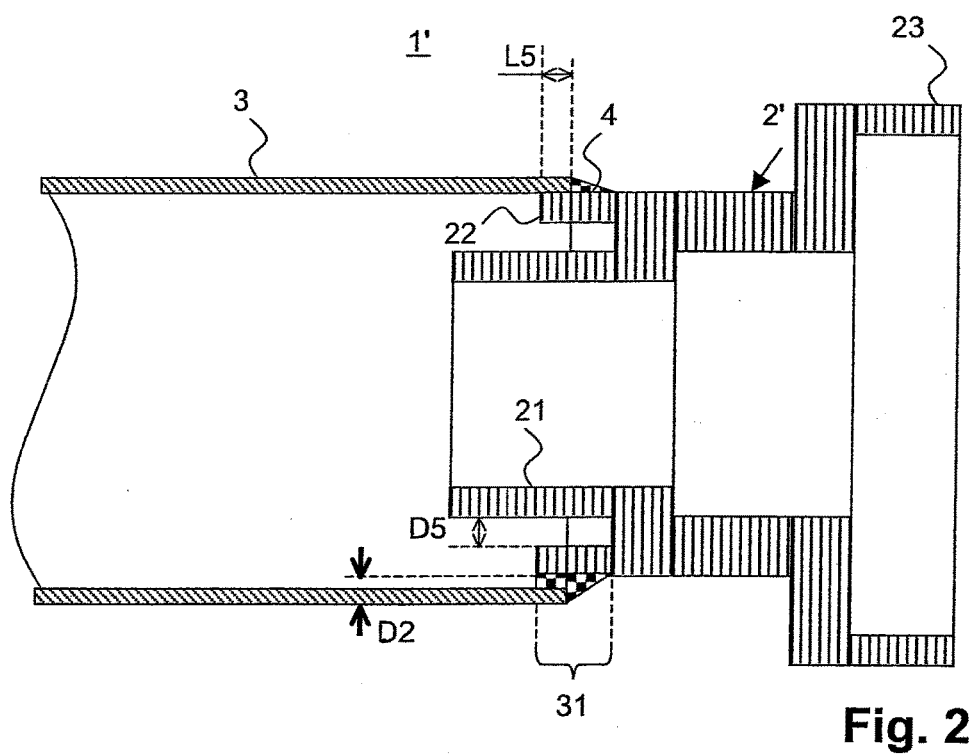
FIG. 2 is a schematic view showing a longitudinal section through an assembly unit composed of at least one connection funnel and a pipe according to a second embodiment.

The second embodiment schematically shown in longitudinal section in FIG. 2 differs from the first embodiment described above in particular by the pipe 3 enclosing the bracket 22 of the connection funnel 2', such that the bracket 22 is arranged in the interior of the pipe 3 in addition to the pipe socket 21 of the connection funnel 2'. Here, the pipe 3 overlaps the bracket 22 in the longitudinal direction of the pipe 3 by a length L5 of 5 mm.

An outer side of the pipe socket 21 is spaced apart from an inner side of the bracket 22 by a distance D5 of 10 mm. The maximum clearance D2 between the inner wall of the pipe 3 and the outer side of the bracket 22 is also 1 mm in the second embodiment and is sealed gas-tightly by the weld seam 4.

In the second embodiment as well, the connection funnel 2' has a connection fitting 23 at its end opposite the pipe socket 21, which (connection fitting) in the second embodiment, however, has an increased internal diameter compared with the pipe socket 21.

Figure 3:
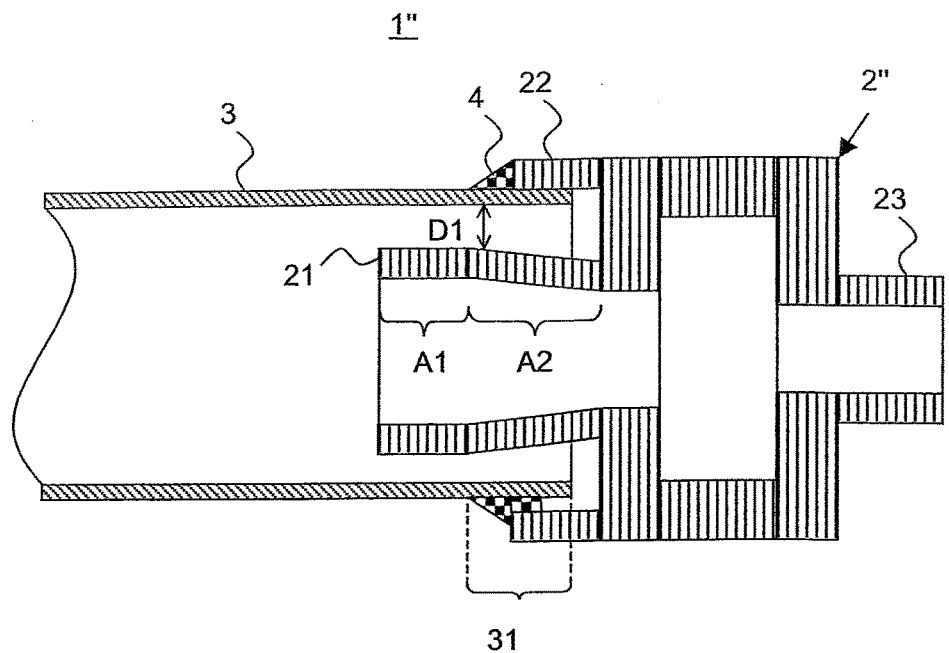
FIG. 3 is a schematic view showing a longitudinal section through an assembly unit composed of at least one connection funnel and a pipe according to a third embodiment.

A third embodiment of an assembly unit according to the present invention is described below with reference to FIG. 3. Since the third embodiment of the assembly unit 1"

schematically shown in longitudinal section in FIG. 3 is very similar to the first embodiment of the assembly unit 1 shown in FIG. 1, only differences will be dealt with below and otherwise reference is made to the explanations of the first embodiment.

The assembly unit 1" shown in FIG. 3 differs from the assembly unit 1 shown in FIG. 1 only by the connection funnel 2" having a pipe socket 21, which is composed of a first section A1 and a second section A2. In the first section A1, an outer side of the pipe socket 21 has a constant distance D1 from the inner wall of the pipe 3, and in the second section A2, an outer side of the pipe socket 21 has a constantly increasing distance D1 from the inner wall of the pipe 3. The second section A2 here is directly adjacent to the first section A1 of the pipe socket 21 and is arranged between the first section A1 of the pipe socket 21 and a main body of the connection funnel 2". Thus, the first section A1 of the pipe socket 21 is located further inserted into the interior of the pipe 3 than the second section A1. Consequently, the pipe socket 21 has a funnel shape having a variable internal diameter in the longitudinal direction of the pipe 3 and of the pipe socket 21. The distance to the bracket 22 is increased in this embodiment of the pipe socket 21 at the connection point of the pipe socket 21 with a main body of the connection funnel 2".

A fourth embodiment of an assembly unit 1' according to the present invention is described below with reference to FIG. 4. Here, a longitudinal section is schematically shown on the left in FIG. 4 and a cross section along the sectional axis A-A is schematically shown on the right in FIG. 4.

Figure 4:
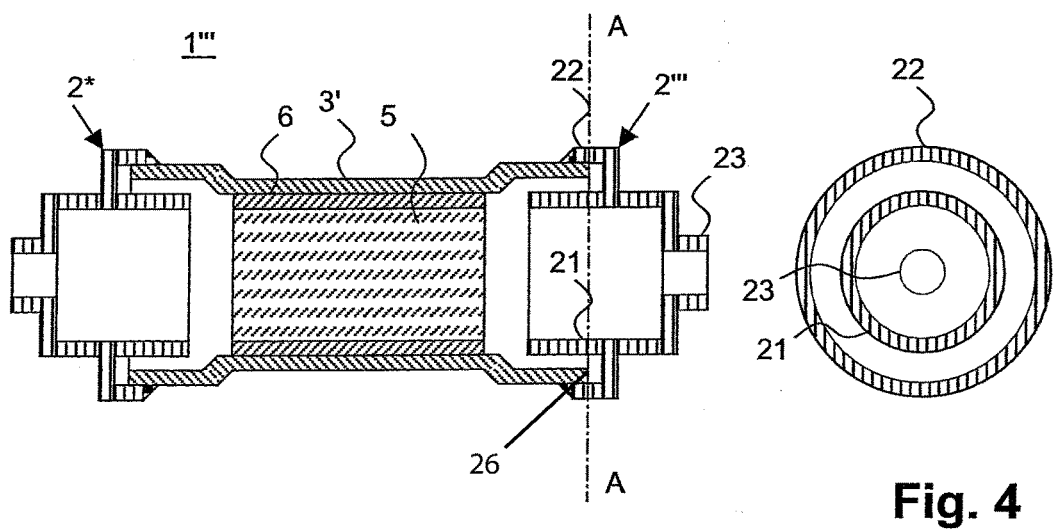
FIG. 4 is a schematic view showing both a longitudinal section and a cross section through an assembly unit composed of two connection funnels and a pipe arranged between the connection funnels according to a fourth embodiment.

As is obvious from FIG. 4, the assembly unit 1' has two connection funnels 2''' and 2* with identical structure arranged in a mirror-inverted manner at both ends of the pipe 3. The structure of these connection funnels 2', 2* is very similar to the structure shown in FIG. 1, so that reference is made to the explanations of the first embodiment.

The pipe 3' has sections, in which the diameter of the pipe 3' is increased, at each of its both ends facing towards the connection funnels 2' and 2*. This makes it easier to form an almost identical internal diameter as in the pipe 3' in the pipe socket 21 of the connection funnels 2' and 2*, such that the flow resistance between the pipe 3' and the connection funnel 2''' or 2* is reduced. In its interior, the pipe 3' accommodates a monolith 5 and an insulating mat made of fiber glass material surrounding same, such that the assembly unit 1' overall forms an exhaust gas catalyst.

As shown in cross section on the right in FIG. 4, both the bracket 22 and the pipe socket 21 in the embodiment shown have a ring-shaped cross section each.

Finally, an embodiment of an exhaust system for a vehicle operated with an internal combustion engine is described with reference to FIG. 5.

Figure 5:
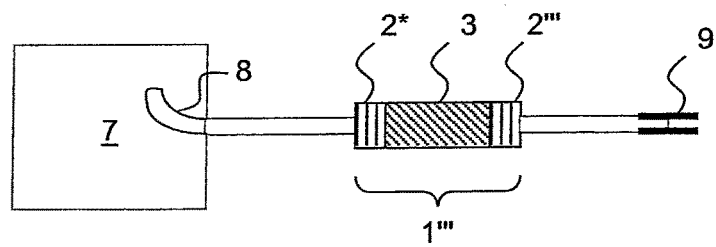
FIG. 5 is a schematic view showing an exhaust system, which uses one of the assembly units of FIGS. 1 through 4.

The exhaust system schematically shown in FIG. 5 has an exhaust elbow 8, which is connected with an internal combustion engine 7. An assembly unit 1''' with the structure shown in FIG. 4 is arranged between the exhaust elbow 8 and a tail pipe 9 via an exhaust pipe. Thus, the tail pipe 9 is in fluid connection with the exhaust elbow 8 via the assembly unit 1'''.

While specific embodiments of the invention have been shown and described in detail to illustrate the application of the principles of the invention, it will be understood that the invention may be embodied otherwise without departing from such principles. Although the above described assembly unit of an exhaust system is particularly well suited for being used in a passenger car, the present invention is not restricted to usage of the assembly unit in passenger cars.

For instance, the assembly unit of an exhaust system my alternatively be used for a motor truck. If used in a motor truck, the diameters defined above may be increased by the 2.5-fold to 3-fold.

What is claimed is:

1. An exhaust catalyst comprising:
a first end connection funnel made of casted material, the first end connection funnel comprising a first end pipe socket having a ring-shaped cross section and a first end bracket having a ring-shaped cross section arranged radially an outer side of the first end pipe socket;
a pipe having a first end connection section fastened to the first end bracket of the first end connection funnel, wherein the first end pipe socket extends beyond the first end connection section of the pipe into an interior of the pipe, wherein a first end connection between the first end connection section of the pipe and the first end bracket of the first end connection funnel is established by a weld seam or a soldered seam,
wherein an exhaust gas which is guided in the pipe, can penetrate a first space formed between the outer side of the first end pipe socket and an inner side of the first end bracket and between the outer side of the first end pipe socket and an inner wall of the pipe,
wherein the first space between the outer side of the first end pipe socket and the inner wall of the pipe is spaced apart by at least a wall thickness of the pipe;
a monolith;
an insulating mat comprising fiber glass material, the insulating mat surrounding the monolith, the monolith and the insulating mat being arranged in the interior of the pipe; and
a second end connection funnel made of cast material, the second end connection funnel comprising a second end pipe socket having a ring-shaped cross section and a second end bracket having a ring-shaped cross section arranged radially an outer side of the second end pipe socket,
wherein the pipe has a second end connection section fastened to the second end bracket of the second end connection funnel, wherein the second end pipe socket extends beyond the second end connection section of the pipe into the interior of the pipe and, wherein a second end connection between the second end connection section of the pipe and the second end bracket of the second end connection funnel is established by a weld seam or a soldered seam,
wherein an exhaust gas which is guided in the pipe, can penetrate a second space formed between the outer side of the second end pipe socket and an inner side of the second end bracket and between the outer side of the second end pipe socket and the inner wall of the pipe, wherein the second space between the outer side of the second end pipe socket and the inner wall of the pipe is spaced apart by at least the wall thickness of the pipe.

2. The exhaust catalyst in accordance with claim 1, wherein each of the first and second end pipe sockets of the first and second end connection funnels extend beyond the first and second end connection sections of the pipe into the interior of the pipe by at least 0.8 cm and by less than 3 cm or by at least 1 cm and by less than 10 cm.

3. The exhaust catalyst in accordance with claim 1, wherein each of the first and second end pipe sockets of the first and second end connection funnels extend beyond the first and second end connection sections of the pipe into the interior of the pipe by at least 1.5 cm or by at least 2 cm.

4. The exhaust catalyst in accordance with claim 1, wherein each of the first and second end pipe sockets of the first and second end connection funnels are spaced apart from the inner wall of the pipe by at least 0.8 mm and not more than 7 mm or by at least 3 mm and less than 3 cm.

5. The exhaust catalyst in accordance with claim 1, wherein the first end pipe socket of the first end connection funnel has a first section, in which the first end pipe socket has a constant distance from the inner wall of the pipe, and has a second section adjacent to the first section, in which the first end pipe socket has a distance from the inner wall of the pipe that is constantly increasing in relation to the distance in the first section, wherein the second section is arranged between the first section and a main body of the first end connection funnel.

6. The exhaust catalyst in accordance with claim 1, wherein each of the first and second end pipe sockets of the first and second end connection funnels have a wall thickness, which corresponds at least to two times the wall thickness of the pipe.

7. The exhaust catalyst in accordance with claim 1, wherein each of the first end and second end connection funnels have a U-shaped cross section respectively, each of the U-shaped cross section being formed with each of a short leg forming the first end and second end brackets respectively and each of a long leg forming the first end and second end pipe sockets respectively, wherein each of the short leg and the long leg are directed towards the pipe and, the short leg having a length that is less than a length of the long leg.

8. The exhaust catalyst in accordance with claim 1, wherein at least one of:
the first and second end brackets of the first and second end connection funnels are arranged inside or outside of the pipe and overlap the pipe in a longitudinal direction of the pipe by at least 1 mm; and the pipe is spaced apart from the first and second end brackets of the first and second end connection funnels by less than 1.5 mm.

9. An exhaust system for a vehicle operated by an internal combustion engine, the exhaust system comprising:
an internal combustion connection exhaust elbow designed for connection to an internal combustion engine;
a tail pipe in fluid connection with the exhaust elbow via an exhaust catalyst;
the exhaust catalyst comprising:
a first end connection funnel made of casted material, the first end connection funnel comprising a first end pipe socket having a ring-shaped cross section and a first end bracket having a ring-shaped cross section arranged radially an outer side of the first end pipe socket;
a pipe having a first end connection section fastened to the first end bracket of the first end connection funnel,
wherein the first end pipe socket extends beyond the first end connection section of the pipe into an interior of the pipe, wherein a first end connection between the first end connection section of the pipe and the first end bracket of the first end connection funnel is established by a weld seam or a soldered seam,
wherein an exhaust gas which is guided in the pipe, can penetrate a first space formed between the outer side of the first end pipe socket and an inner side of the first end bracket and between the outer side of the first end pipe socket and an inner wall of the pipe, wherein the first space between the outer side of the first end pipe socket and the inner wall of the pipe is spaced apart by at least a wall thickness of the pipe;
a monolith;
an insulating mat comprising fiber glass material, the insulating mat surrounding the monolith, the monolith and the insulating mat being arranged in the interior of the pipe; and
a second end connection funnel made of cast material, the second end connection funnel comprising a second end pipe socket having a ring-shaped cross section and a second end bracket having a ring-shaped cross section arranged radially an outer side of the second end pipe socket,
wherein the pipe has a second end connection section fastened to the second end bracket of the second end connection funnel, wherein the second end pipe socket extends beyond the second end connection section of the pipe into the interior of the pipe and, wherein a second end connection between the second connection section of the pipe and the second end bracket of the second end connection funnel is established by a weld seam or a soldered seam,
wherein an exhaust gas which is guided in the pipe, can penetrate a second space formed between the outer side of the second end pipe socket and an inner side of the second end bracket and between the outer side of the second end pipe socket and the inner wall of the pipe, wherein the second space between the outer side of the second end pipe socket and the inner wall of the pipe is spaced apart by at least the wall thickness of the pipe.

10. The exhaust system in accordance with claim 9, wherein:
each of the first end and second end pipe sockets of the first end and second end connection funnels extend beyond the first end and second end connection sections of the pipe into the interior of the pipe by at least 1 cm and by less than 10 cm; and
the first end and second end pipe sockets of the first end and second end connection funnels are spaced apart from the inner wall of the pipe by at least 3 mm and wherein at least one of:
the first end and second end bracket of the first end and second end connection funnels are arranged inside or outside of the pipe and overlaps the pipe in a longitudinal direction of the pipe by at least 1 mm;
the pipe is spaced apart from the first end and second end brackets of the first end and second end connection funnels by less than 1.5 mm.

11. The exhaust system in accordance with claim 9, wherein the first end pipe socket of the first end connection funnel has a first section, in which the first end pipe socket has a constant distance from the inner wall of the pipe, and has a second section adjacent to the first section, in which the first end pipe socket has a distance from the inner wall of the pipe that is constantly increasing in relation to the distance in the first section, wherein the second section is arranged between the first section and a main body of the first end connection funnel.

12. The exhaust system in accordance with claim 9, wherein each of the first and second end pipe sockets of the first and second end connection funnels have a wall thickness, which corresponds at least to two times the wall thickness of the pipe.

13. The exhaust system in accordance with claim 9, wherein each of the first end and second end connection funnels have a U-shaped cross section respectively, each of the U-shaped cross section being formed with each of a short leg forming the first end and second end brackets respectively and each of a long leg forming the first end and second end pipe sockets respectively, wherein each of the short leg and the long leg are directed towards the pipe and, the short leg having a length that is less than a length of the long leg.

* * * * *